3,084,023
TREATMENT OF GASES
Holger C. Andersen, Morristown, Philip L. Romeo, Sr., Old Bridge, and Duane R. Steele, Newark, N.J., assignors, by mesne assignments, to Engelhard Industries, Inc., Newark, N.J., a corporation of Delaware
No Drawing. Filed Mar. 11, 1960, Ser. No. 14,176
2 Claims. (Cl. 23—3)

This invention relates to the preferential removal of impurities from a gaseous admixture of hydrogen and carbon monoxide, without substantial loss of either hydrogen or carbon monoxide; more particularly, the invention relates to the removal of objectionable impurities such as acetylenics, dienes, both in linear and ring configuration of carbon atoms, nitrogen oxides, and sulfur-containing compounds such as COS and $CS_2$.

In the process of the present invention, the objectionable impurities are removed, but no carbon monoxide or hydrogen is removed, except inadvertently. For example, if oxygen is present, some carbon dioxide or water may be formed under the reaction conditions, but such water and carbon dioxide products are generally harmless and, if desired, may be readily removed. If oxygen is present, a low concentration is required, i.e. less oxygen, preferably much less, than the stoichiometric quantity required for oxidation of carbon monoxide to carbon dioxide.

An important industrial gas is coke oven gas having the following typical composition:

| | Mol percent |
|---|---|
| $H_2$ | 51 |
| $N_2+Ar$ | 11 |
| CO | 10 |
| $O_2$ | 0.8 |
| $CH_4$ | 25 |
| $C_2H_4$ | 2 |
| $C_2H_2$ | 0.2 | plus small concentrations of many other compounds. The process of the present invention is applicable to the purification of this gas, and is also applicable to the purification of a wide range of other gaseous mixtures in which carbon monoxide and hydrogen are important constituents. For example, removal of acetylene and nitric oxide can, by means of the present invention, be achieved from a stream containing 95 percent carbon monoxide and 4 percent hydrogen.

In addition to the removal of impurities, the process of the present invention is highly selective with respect to ethylene, i.e. the ethylene content is either substantially completely preserved or, in some cases, actually increased. This is an important feature of gas treatment where the ethylene is to be used subsequently for producing compounds such as ethylene oxide, polyethylene, and the like.

It is important to remove the impurities listed above as such removal will prevent vapor-phase gum formation, which is a nuisance and may be hazardous as some deposited gums will explode. The nuisance from the gums is particularly found in small lines and burner nozzles. The importance of removing such gums deposited from the vapor of coke oven gas is seen in a currently used process of allowing the gums to deposit in a large vessel placed in the line, from which the gums are periodically removed. If a cold box is used, solid acetylene may accumulate therein causing a particularly serious explosion hazard.

The process of the present invention consists of passing a gaseous mixture over a catalyst consisting of one or more metals of the platinum group, or nickel, with or without a support. The platinum metals which have been found to be especially efficacious are platinum, palladium and ruthenium. Suitable catalyst supports includes alumina, silica, kieselguhr, silica gel, diatomaceous earth and the like.

For optimum conversion, the catalyst precious metal should be present in the range of about 0.001 to 2 percent by weight of the catalyst metal and support, where a support is employed, preferably about 0.002 to 1 percent by weight of the catalyst metal and support. The support for the catalyst metal may be in the form of pellets, powder or granules, and preferably comprises activated alumina. The supported catalyst may be prepared in any suitable manner, i.e. by treating the carrier or support with a solution of a suitable metal compound, and then reducing the metal compound to metal. Nickel catalyst may, because of the lower cost, contain from 1 to 80 percent nickel.

The reaction temperature required for efficient purification varies with conditions, especially the sulfur content of the stream, but is typically in the range of about 100 to 250° C., and it is necessary that any oxygen present be less than the stoichiometric quantity required for oxidation of the carbon monoxide to carbon dioxide, preferably much less than the stoichiometric quantity required, in order to avoid loss of valuable carbon monoxide.

The reaction pressure may be in the range of atmospheric to about 300 p.s.i.g., or higher, and the space velocity may be in the range of about 1000 to 20,000 standard volumes of gas per volume of catalyst per hour, preferably 4,000 to 15,000 standard volumes per volume, these space velocities being measured at 32° F. and at atmospheric pressure.

Under the reaction conditions of the process of the invention, the impurities in the gaseous stream are hydrogenated to the following products:

| Impurity | Product |
|---|---|
| NO | $NH_3$. |
| $C_2H_2$ | $C_2H_4$, $C_2H_6$. |
| Dienes | Olefins. |
| COS | $H_2S$. |

The ethylene is slightly decreased at low carbon monoxide levels, preserved at moderate carbon monoxide levels, and increased at high carbon monoxide levels. The process of the invention is applicable to gases containing 5 to 98 percent carbon monoxide, and 2 to 90 percent hydrogen, the balance consisting of inert gases such as nitrogen, argon, carbon dioxide, methane and smaller quantities of ethylene and the impurities previously mentioned; oxygen may or not be present.

The preferred catalysts are related to the removal of specific impurities in the following manner:

| Impurity to be removed | Preferred catalysts |
|---|---|
| $C_2H_2$ only | Pd. |
| NO only | Ru. |
| $C_2H_2$ and NO | Pd+Ru, Pt. |
| Diolefins | Ru. |
| COS | Pd+Ru. |

Nickel catalysts are also effective in these purifications. However, they tend to ignite when exposed to air after use in a reducing atmosphere, and this pyrophoric property makes the use of nickel hazardous as compared with the platinum metals. Furthermore, the nickel catalyst tends to crumble in use, converting the catalyst pellets into powder which blocks passage of the gas in the reactor.

The invention will be further illustrated by reference to the following specific examples, in which all gaseous percentages are by volume:

EXAMPLE I

To demonstrate the effect of CO on selectivity, $$CO—C_2H_2—C_2H_4—CH_4—H_2$$

mixtures were passed over 0.5 percent Ru on ⅛" activated alumina pellets at a pressure of 1 atmosphere and a space velocity of 8000 s.c.f.h./c.f. Analyses of the effluent gas for $C_2H_2$ and $C_2H_4$ showed the following:

| Inlet | | | | | Outlet | | |
|---|---|---|---|---|---|---|---|
| Percent CO | Percent $C_2H_2$ | Percent $C_2H_4$ | $H_2$ | $CH_4$ | Temp., °C. | P.p.m. $C_2H_2$ | Percent $C_2H_4$ |
| 0 | 0.23 | 2.0 | 84 | 13.5 | 75 | 1,560 | 2.04 |
| | | | | | 115 | 31 | 0.13 |
| 0.2 | 0.23 | 2.07 | 84 | 13.5 | 140 | 880 | 1.90 |
| | | | | | 205 | <30 | 0.36 |
| 4.0 | 0.21 | 1.95 | 81 | 13 | 205 | 360 | 1.94 |
| | | | | | 265 | <30 | 1.72 |
| 10 | 0.2 | 1.76 | 57 | 31 | 250 | 80 | 1.85 |
| | | | | | 325 | <30 | 1.28 |
| 33 | 0.2 | 1.87 | 42 | 23 | 225 | 180 | 1.92 |
| | | | | | 265 | <30 | 1.72 |
| 60 | 0.16 | 1.35 | 24 | 14 | 180 | 1,100 | 1.36 |
| | | | | | 265 | 40 | 1.32 |

The data show that, as the CO increases, an increasing fraction of the ethylene content is retained, under conditions resulting in acetylene removal to the limit of detection in this experiment.

EXAMPLE II

A coke oven type gas containing 56 percent $H_2$, 31.5 $CH_4$, 10.5 CO, 2 $C_2H_4$, 0.2 $C_2H_2$ and 30 p.p.m. NO was passed at atmospheric pressure over various catalysts, and impurities were determined in the effluent gas as follows:

| Catalyst | Space velocity, s.c.f.h./c.f. | Temp., °C. | NO | Effluent, $C_2H_2$ | P.p.m. $C_2H_4$ |
|---|---|---|---|---|---|
| 0.016 percent Pd on ⅛" activated alumina pellets. | 12,500 | 173 | 11 | <2 | |
| | | 274 | 13 | | 0 |
| 0.5 percent Pt on ⅛" activated alumina spheres. | 8,000 | 204 | 6.6 | | |
| | | 235 | 2.9 | | >8,900 |
| 0.5 percent Ru on ⅛" activated alumina pellets. | 8,000 | 169 | <0.2 | | |
| | | 232 | | <5 | 18,800 |

This example shows Pd to be especially effective for $C_2H_2$ removal and Ru to be good for NO removal.

EXAMPLE III

A combination of palladium and ruthenium catalyst was employed to result in good removal of NO, $C_2H_2$ and COS. Further, a life test was made with variations in pressure and sulfur content. The stream consisted essentially of 59.8 percent $H_2$, 10 percent CO, 28 percent $CH_4$, 2.0 percent $C_2H_4$, 0.2 percent $C_2H_2$, and 30–70 p.p.m. NO.

A gas flow of 32 LPH (NTP) was used, through a bed consisting of 5 ml. of Pyrex glass beads, 4 ml. of 0.015 percent Pd on ⅛" activated alumina catalyst, and 4 ml. of 0.5 percent Ru on ⅛" activated alumina catalyst. Table I summarizes the impurity removal. The presence of oxygen improved removals. The carbonyl sulfide was converted largely to $H_2S$, which is removable by means such as caustic scrubbing.

*Table I*

| Running hours | Pressure, p.s.i.g. | Inlet additions | | Cat. temp., °C. | Outlet, p.p.m. | | | | |
|---|---|---|---|---|---|---|---|---|---|
| | | P.p.m. COS | Percent $O_2$ | | NO | $C_2H_2$ | COS | $C_2H_4$ | Other |
| 121 | 0 | 0 | 0 | 147 | <0.3 | <2 | | 1.8 | |
| 339 | 0 | 100 | 0 | 201 | 2.8 | | | | |
| 435 | 0 | 0 | 0 | 184 | <0.3 | <2 | | | |
| 799 | 0 | 20 | 0.2 | 191 | <0.3 | | | | |
| 818 | 0 | 20 | 0 | 221 | 1.3 | | | | |
| 913 | 0 | 20 | 0.1 | 193 | <0.3 | | | | |
| 986 | 0 | 20 | 0.17 | 213 | <0.3 | 8 | | | 0.32% $CO_2$. |
| 1,296 | 0 | 0 | 0 | 203 | <0.3 | <2 | | | App. 0.01% $NH_3$. |
| 1,442 | 0 | 100 | 0.20 | 209 | <0.3 | 50 | 25 | | $H_2S$. |
| 1,661 | 0 | 100 | 0.28 | 242 | <0.3 | | | | |

CATALYST TREATED WITH 100 PERCENT $H_2S$ FOR 1 HOUR AT 200° C.

| 1,765 | 0 | 0 | 0.22 | 186 | <0.3 | <2 | | | |
| 1,861 | 190 | 200 | 0.2 | 190 | 0.01 | 19 | | | |
| 1,867 | 190 | 200 | 0.2 | 224 | | <2 | | <10 | 0.046% $H_2S$. |
| 2,150 | 200 | 400 | 0.2 | 155 | <0.02 | | | 22 | 0.03% $H_2S$. |
| 2,199 | 200 | 400 | 0.2 | 235 | | <2 | | 28 | |

EXAMPLE IV

A coke oven gas was passed over nickel catalyst containing about 60 percent nickel at a space velocity of 14,000 s.c.f.h./c.f. and 160 p.s.i.g. pressure. At 260° C., the impurities were removed as follows:

$C_2H_2$, from 2000 p.p.m. to <2 p.p.m.
NO, from 61 p.p.m. to <0.03 p.p.m.
COS, from 73 p.p.m. to 16 p.p.m.

the 2.00 percent $C_2H_4$ present remained in the purified gas.

EXAMPLE V

A gas consisting of 94 percent CO, 4 percent $H_2$, 1 percent $N_2$, 0.02 percent $O_2$, 0.5 percent $C_2H_4$, 0.1 percent $C_2H_4$ and 30 p.p.m. NO was passed over 0.5 percent Pt on ⅛" activated alumina catalyst pellets at atmospheric pressure and 8000 s.c.f.h./c.f. At 202° C., the $C_2H_2$ was removed to <2 p.p.m., and at 218° C., the NO was removed to <0.3 p.p.m. Good purification was also obtained in the presence of 0.1 percent COS.

At a pressure of 320 p.s.i.g., removal of both $C_2H_2$ and NO over the 0.5 percent Pt catalyst to limits of detection occurred at 182° C., with a gas of the following composition:

- 80% CO
- 10% $CO_2$
- 4% $H_2$
- 4% $CH_4$
- 0.5% $C_2H_4$
- 0.5% $H_2S$
- 0.3% COS
- 0.1% $C_2H_2$
- 0.2% $O_2$
- 5–30 p.p.m. NO

In a life test conducted at 300 p.s.i.g., the ethylene content increased by as much as 600 p.p.m. as a result of acetylene hydrogenation.

EXAMPLE VI

A gas mixture consisting of 10 percent CO, 60 percent $H_2$ and 30 percent $N_2$ was led over a container of cyclopentadiene, and thence over 0.5 percent Ru on 1/8" activated alumina catalyst pellets at 8000 hourly space velocity. The cyclopentadiene content, estimated at approximately 3 percent, was reduced to the following values:

120° C. catalyst temperature—1300 p.p.m.
150° C. catalyst temperature—1040 p.p.m.
175° C. catalyst temperature—260 p.p.m. (limit of sensitivity)

EXAMPLE VII

A mixture containing 60 percent $H_2$, 10 percent CO, 0.05 percent $C_2H_2$, 0.05 percent $C_2H_4$ and 0.1 percent butadiene (balance $N_2$) was passed at 7200 s.c.f.h./c.f., over 0.5 percent Ru on 1/8" activated alumina catalyst pellets at atmospheric pressure. The following impurity concentrations were found in the effluent:

100° C., 0.05% $C_2H_2$—0.05% $C_2H_4$—0.096% $C_4H_6$
210° C., <0.002% $C_2H_2$—0.04% $C_2H_4$—0.010% $C_4H_6$
225° C., <0.0002% $C_2H_2$—0.05% $C_2H_4$—<0.005% $C_4H_6$

Butene-1 was found in the purified gas by infrared analysis.

Similar results were found with nickel catalyst.

It will be obvious to those skilled in the art that many modifications may be made within the scope of the present invention without departing from the spirit thereof, and the invention includes all such modifications.

What is claimed is:

1. A process for the preferential removal of acetylene, nitrogen oxides and carbonyl sulfide as impurities from admixture with a hydrogen- and carbon monoxide-containing gas, which comprises contacting the gas containing impurities consisting essentially of acetylene, nitrogen oxides and carbonyl sulfide in the absence of any added reducing gas with a supported catalyst containing palladium and ruthenium as catalytically active metal deposited on a solid catalyst support, the catalytically active metal being present in the range of about 0.001 percent to 2 percent by weight based on catalytic metal plus support, at a temperature in the range of about 100°–300° C., any oxygen present in the gas being less than the stochiometric quantity required for oxidation of carbon monoxide to carbon dioxide.

2. A process according to claim 1 in which the gas contains, by volume, 2 to 90 percent hydrogen and 5 to 98 percent carbon monoxide.

References Cited in the file of this patent

UNITED STATES PATENTS

| | | |
|---|---|---|
| 1,962,485 | Dely | June 12, 1934 |
| 2,910,343 | Childers et al. | Oct. 27, 1959 |
| 2,957,925 | Oettinger | Oct. 25, 1960 |